Figure 1:
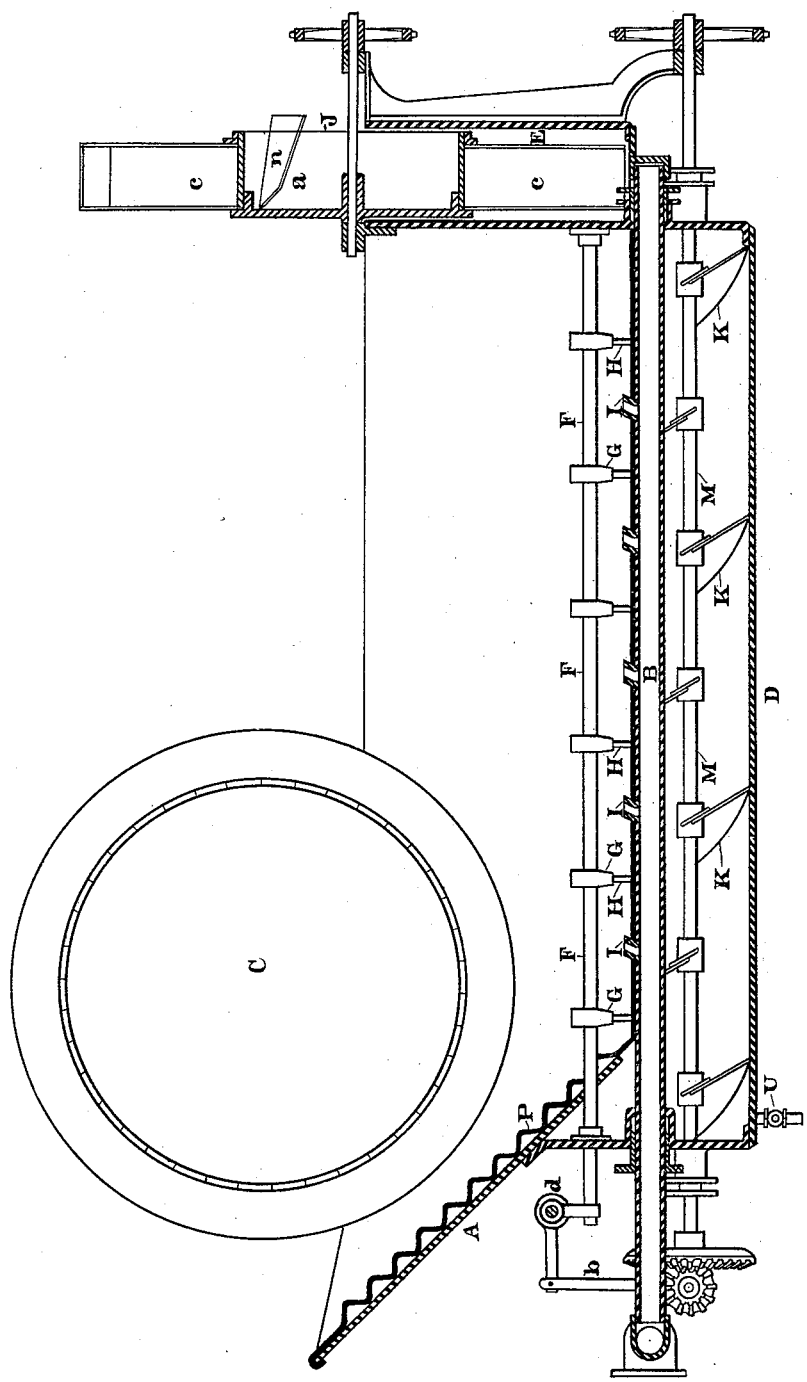

(No Model.) 2 Sheets—Sheet 1.

J. L. HAYWARD.
MACHINE FOR EXTRACTING GOLD, &c., FROM PULVERIZED ORES.

No. 329,832. Patented Nov. 3, 1885.

WITNESSES
INVENTOR
Jacob L. Hayward.

(No Model.) 2 Sheets—Sheet 2.
J. L. HAYWARD.
MACHINE FOR EXTRACTING GOLD, &c., FROM PULVERIZED ORES.
No. 329,832. Patented Nov. 3, 1885.
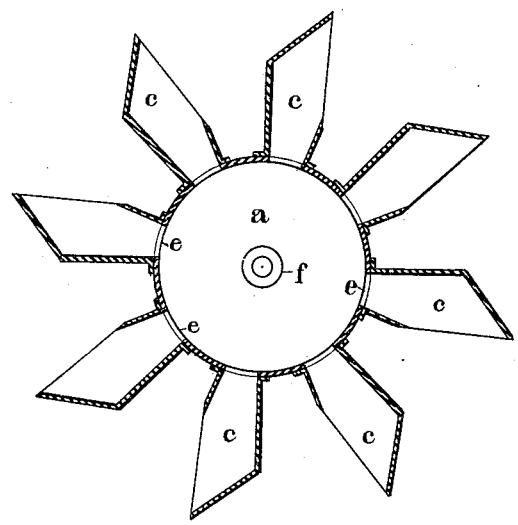
Fig. 3.
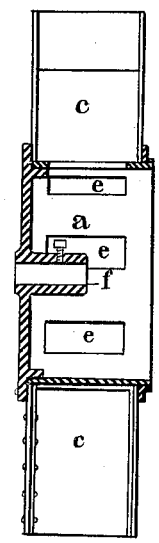
Fig. 4.
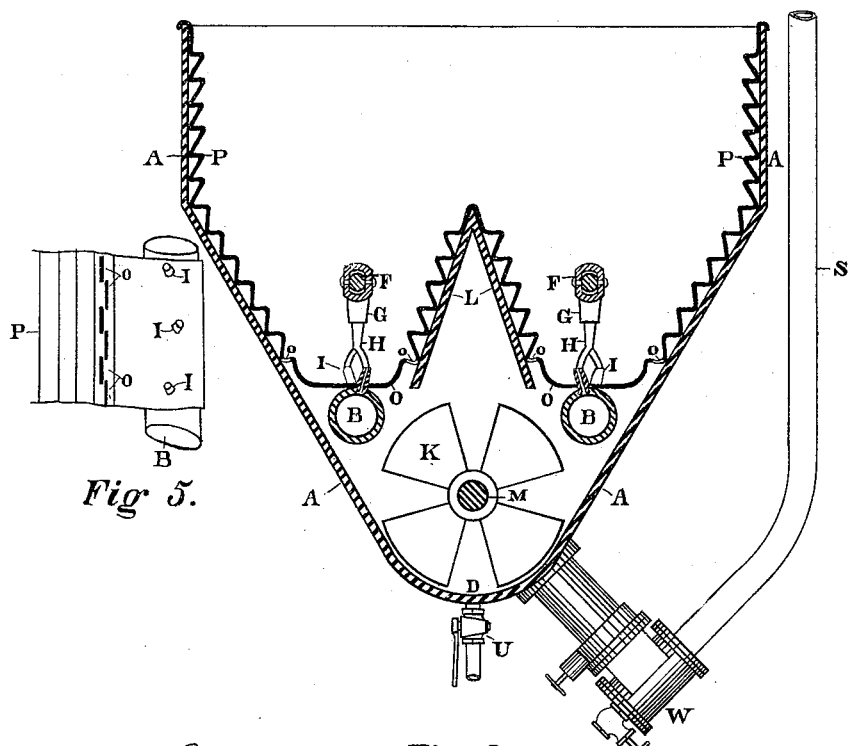
Fig. 5.
Fig. 2.
WITNESSES
INVENTOR
Jacob L. Hayward

UNITED STATES PATENT OFFICE.

JACOB L. HAYWARD, OF FRAMINGHAM, MASSACHUSETTS, ASSIGNOR OF TWO-THIRDS TO THOMAS C. SIMONTON AND THOMAS C. SIMONTON, JR., OF PATERSON, NEW JERSEY.

MACHINE FOR EXTRACTING GOLD, &c., FROM PULVERIZED ORES.

SPECIFICATION forming part of Letters Patent No. 329,832, dated November 3, 1885.

Application filed July 11, 1885. Serial No. 171,291. (No model.)

*To all whom it may concern:*

Be it known that I, JACOB L. HAYWARD, a citizen of the United States, residing at Framingham, in the county of Middlesex and State of Massachusetts, have invented new and useful Improvements in Machines for Extracting from Pulverized Ores the Gold and Silver Therein, and the Gold from Auriferous Sands and Gravels, of which the following is a specification.

These improvements relate to a class of machines for this purpose shown and described in Letters Patent of the United States issued to myself on the 23d day of June, 1885, No. 320,655, in which upward currents of water or steam are forced through a body of water confined in a tank lined with amalgamated plates to continually carry the material being treated, from the time it is fed into the machine until discharged into a tailing-tank, to the surface of the water, and there allow it to gravitate and come in contact with the amalgamated plates.

My improvements consist in dividing a tank into two or more longitudinal valleys and bottoms, with a common bottom beneath entirely separated from the main tank, except through small openings or spaces, through which the mercury fed on the amalgamated plates lining the sides and valleys of the tank above may flow; to use the true or common bottom as a mercury-receptacle and settling and separating chamber; to provide means to separate the mercury and amalgam in this settling and separating chamber or real bottom from such part of the material as may find its way from the main tank above therein; to convey the material treated after it has passed from the main tank into the tailing-tank as refuse out of the latter tank.

I attain these objects by the mechanism illustrated in the accompanying drawings, in which Figure 1 is a longitudinal section of the machine, showing only one valley. Fig. 2 is a cross-section of the same, showing the main tank divided into two valleys and the common bottom beneath. Fig. 3 is a front view of the tailing-wheel. Fig. 4 is a cross-section of the same. Fig. 5 is a short plan view of a section of the amalgamated plates and of the supply-pipe to show the slotted openings $o$ in the amalgamated plates.

Like letters refer to like parts throughout all the views.

A designates the tank; B, the supply-pipes; I, the orifices or jets thereon.

C is the revolving cylinder, which should be formed of two screens—an inner of a very coarse mesh and made of sheet-steel and an outer of wire and of a finer mesh. Each screen should have on its inner surface an Archimedean screw-blade, so as to convey all the material too coarse to pass through the meshes of the screens out of the cylinder at the end opposite that in which it is fed, while the fine material falls from the outer screen into the tank A below.

P are the riffled amalgamated plates lining the inside of the tank.

D is the true or common bottom of the main tank, and is separated from the rest of the tank by the false sides L and false bottoms O, except through the slotted openings $o$ or the longitudinal spaces between the false bottoms and the sides or valleys, as shown and described in the Letters Patent granted to me, above referred to, or like openings.

M is the shaft to drive the tailing-wheel in tailing-tank E, and runs through the true bottom of the tank beneath the false bottoms.

K are the wings or arms on the shaft, and their object is to convey all the mercury, amalgam, and such material as gets into D, the true bottom, to the end under the cylinder, and at the same time separate the mercury and amalgam from the material so that the mercury and amalgam may be drawn off through stop-cock U, and the material as often as is necessary put back by steam-jet pump W, through pipe S, into the tank for further treatment.

F is a rod on which are stirring-arms G and fingers H, an arm and fingers being shown between each of the jets I. The rod, arms, and fingers are moved backward and forward by rod $b$ and rock-shaft $d$ by means of eccentric. (Not shown.)

A rod with arms and fingers for all the spaces between the jets 1 are to be placed in each of the longitudinal valleys, and their object is to prevent the sand or other material being treated from packing in the tank between the jets.

As the rod, arms, and fingers move backward and forward they cut the sand, clay, or other material so that it cannot pack hard between the jets, and force it to come in contact with the currents of water issuing out of the jets, by which it is caught up and carried continually forward toward the tailing-tank, into which it finally passes.

In the patent heretofore granted to me and above referred to I showed and claimed stirring arms and fingers which moved across the tank. These herein shown move backward and forward between the jets.

The tailing-wheel J is in tailing-tank E, and into this tank all the material, after having been treated in the main tank A, passes as refuse material through openings in the lower part of the partition between the two tanks, and through these openings all the water forced into the main tank through supply-pipes B and orifices or jets I also passes into the tailing-tank E, and from that escapes over an overflow.

a is the open cylinder or body of the tailing-wheel. f is the hub of the tailing-wheel. c are the buckets or arms of the wheel. These arms may be curved or straight, and the upper surface of each is open, so that as they revolve in the tailing-tank and commence to rise they scoop up the dirt in the bottom thereof and hold it until they begin to rise above the horizontal, when the material slides down the arms or buckets through openings e to the center of the wheel, and falls into trough N, and is discharged over the tank. These arms may be curved pipes, like an elbow, and only open at their extreme end.

The mode of operation of machines of this class has been described by me in said Letters Patent. There is therefore no need of my fully explaining it here.

The mercury fed on the plates P, flowing down them, carries with it the amalgam and gold then on the plates and passes into the common bottom D through the slotted openings o, or said longitudinal spaces described in said former patent, or other like openings. A small portion of the material being treated also passes through these openings. The shaft M, with wings or arms K slowly revolving, conveys all in the real bottom D to the end under the revolving cylinder, the bottom being lower at that end, and at the same time separates the mercury and amalgam from the material and allows the mercury and amalgam to settle to the bottom over stop-cock u, through which it is drawn off, while the material is conveyed as often as necessary out of the bottom D by the steam-jet pump W, through pipe S, back into the tank for further treatment. The great bulk of the material passes, after treatment in the main tank, into the tailing-tank, and is discharged out of the latter tank by the tailing-wheel J, as heretofore shown.

By the use of the false sides L and bottoms O the tank is divided into two longitudinal valleys having a common bottom, D, beneath. By the use of additional false sides and bottoms the tank may be divided into as many longitudinal valleys and bottoms as desired, with a common bottom beneath.

I am aware that machines for this purpose have been used having two or more longitudinal valleys, and being provided with a revolving cylinder, and having a tailing-tank attached, and having the main tank lined with amalgamated plates. I do not therefore claim such a combination, broadly; but I am not aware that in any machines for this purpose were or are the tank or tanks divided into two or more longitudinal valleys, and having a common bottom beneath the valleys, which said bottom is or was entirely separated from the main tank above, as I have hereinbefore shown.

What I desire to secure by Letters Patent is—

1. In a tank, the false sides L, in combinaton with false bottoms O, arranged to divide the tank into two longitudinal valleys, with a common bottom beneath, provided with shaft M, wings K, stop-cock U, steam-jet pump W, and pipe S, substantially as and for the purposes set forth.

2. The common bottom D, in combination with sides L and bottoms O, plates P, provided with slotted openings o, shaft M, wings K, stop-cock U, and steam-jet pump W, substantially as and for the purposes set forth.

3. Tank A, in combination with false sides L, bottoms O, supply-pipes B, jets I, and common bottom D, substantially as and for the purposes set forth.

4. The combination of tank A, provided with two or more longitudinal valleys, false bottoms O, amalgamated plates P, common bottom D, and revolving cylinder C, substantially as and for the purposes set forth.

5. Tank A, divided into two or more longitudinal valleys and each valley supplied with a supply-pipe having orifices or jets on its upper surface, in combination with rod F, arms G, and fingers H, substantially as and for the purposes hereinbefore set forth.

6. The combination of tank A, cylinder C, amalgamated plates P, false bottoms O, and common bottom D, in combination with supply-pipes B and jets I, and tailing-tank E, provided with tailing-wheel J, substantially as and for the purposes hereinbefore set forth.

JACOB L. HAYWARD.

Witnesses:
WILLIAM A. BORDEN,
GEO. S. HILTON.